(12) United States Patent
Moncomble et al.

(10) Patent No.: US 10,491,681 B2
(45) Date of Patent: Nov. 26, 2019

(54) METHOD AND A DEVICE FOR ENRICHING A CALL

(71) Applicant: Orange, Paris (FR)

(72) Inventors: Ghislain Moncomble, Plestin les Greves (FR); Jean-Sebastien Meurisse, Louannec (FR)

(73) Assignee: ORANGE, Paris (FR)

( * ) Notice: Subject to any disclaimer, the term of this patent is extended or adjusted under 35 U.S.C. 154(b) by 166 days.

(21) Appl. No.: 14/469,217

(22) Filed: Aug. 26, 2014

(65) Prior Publication Data

US 2015/0058398 A1 Feb. 26, 2015

(30) Foreign Application Priority Data

Aug. 26, 2013 (FR) ...................... 13 58179

(51) Int. Cl.
*H04M 3/42* (2006.01)
*H04L 29/08* (2006.01)
(Continued)

(52) U.S. Cl.
CPC .......... *H04L 67/14* (2013.01); *H04L 12/1822* (2013.01); *H04L 65/1089* (2013.01);
(Continued)

(58) Field of Classification Search
CPC . H04L 67/14; H04L 12/1822; H04L 65/1089; H04L 65/1096; H04L 65/4015;
(Continued)

(56) References Cited

U.S. PATENT DOCUMENTS

| 5,764,901 A | * | 6/1998 | Skarbo | .................. | G06Q 10/10 |
| | | | | | 348/E7.078 |
| 7,136,398 B1 | * | 11/2006 | Huart | .................. | H04M 3/567 |
| | | | | | 370/260 |

(Continued)

FOREIGN PATENT DOCUMENTS

| EP | 1211875 A2 | 6/2002 |
| WO | 01/93507 A2 | 12/2001 |

OTHER PUBLICATIONS

Correia, Nuno; Chambel, Teresa, "Active Video Watching using Annotation," Oct. 30, 1999, http://dl.acm.org/citation.cfm?id=319919.*

(Continued)

*Primary Examiner* — Shirley X Zhang
(74) *Attorney, Agent, or Firm* — David D. Brush; Westman, Champlin & Koehler, P.A.

(57) ABSTRACT

A method and a device are provided for enriching a call that is set up between at least a transmitter terminal and a receiver terminal. The method includes a step of the receiver terminal receiving at least one item of enriching information. The enriching method acts as a function of at least one parameter relating to the call to determine at least one playback model for the enriching information. The determined playback model enables the enriching information and a visual stream of the call to be positioned on a display device associated with the receiver terminal. The enriching information and the visual stream of the call are then played back on the receiver terminal in application of the determined playback model.

10 Claims, 2 Drawing Sheets

(51) Int. Cl.
| | | |
|---|---|---|
| *H04L 12/18* | (2006.01) | |
| *H04M 3/56* | (2006.01) | |
| *H04L 29/06* | (2006.01) | |
| *H04N 21/43* | (2011.01) | |
| *H04M 1/57* | (2006.01) | |

(52) U.S. Cl.
CPC ...... *H04L 65/1096* (2013.01); *H04L 65/4015* (2013.01); *H04L 67/10* (2013.01); *H04L 67/16* (2013.01); *H04M 3/42042* (2013.01); *H04M 3/567* (2013.01); *H04M 1/575* (2013.01); *H04N 21/4307* (2013.01)

(58) Field of Classification Search
CPC ........ H04L 67/16; H04L 67/10; H04M 3/567; H04M 3/42042; H04M 1/575; H04M 3/42; H04N 21/4307
See application file for complete search history.

(56) References Cited

U.S. PATENT DOCUMENTS

| | | | | |
|---|---|---|---|---|
| 8,472,591 | B2* | 6/2013 | Reynolds | H04M 19/041 379/207.16 |
| 8,832,233 | B1* | 9/2014 | Brin | H04L 29/06476 709/203 |
| 8,959,453 | B1* | 2/2015 | Harnish | H04N 7/0122 715/719 |
| 2002/0063727 | A1* | 5/2002 | Markel | G06F 3/14 345/661 |
| 2004/0032946 | A1* | 2/2004 | Koser | H04M 3/02 379/373.01 |
| 2004/0039934 | A1* | 2/2004 | Land | G11B 27/34 726/26 |
| 2007/0047523 | A1* | 3/2007 | Jiang | H04M 3/02 370/352 |
| 2008/0068446 | A1* | 3/2008 | Barkley | H04N 7/147 348/14.07 |
| 2008/0152097 | A1* | 6/2008 | Kent | H04L 12/66 379/93.01 |
| 2009/0023395 | A1* | 1/2009 | Chang | G06F 13/102 455/74.1 |
| 2009/0066722 | A1* | 3/2009 | Kriger | G06Q 30/02 345/619 |
| 2009/0153585 | A1* | 6/2009 | Mahajan | G09G 5/006 345/629 |
| 2009/0262915 | A1* | 10/2009 | Wu | H04M 3/02 379/207.16 |
| 2009/0300520 | A1* | 12/2009 | Ashutosh | H04L 12/1831 715/756 |
| 2010/0081116 | A1* | 4/2010 | Barasch | A63B 24/0003 434/252 |
| 2010/0142412 | A1* | 6/2010 | Synnergren | H04L 29/06027 370/261 |
| 2010/0159942 | A1 | 6/2010 | Lewis et al. | |
| 2010/0231791 | A1* | 9/2010 | Prestenback | H04N 5/44591 348/565 |
| 2010/0233997 | A1* | 9/2010 | Hou | H04M 3/42051 455/412.1 |
| 2010/0293190 | A1* | 11/2010 | Kaiser | G06F 3/048 707/769 |
| 2011/0153656 | A1* | 6/2011 | Sundstrom | H04L 67/06 707/769 |
| 2011/0249073 | A1* | 10/2011 | Cranfill | H04N 7/147 348/14.02 |
| 2011/0310120 | A1* | 12/2011 | Narayanan | G06T 19/006 345/633 |
| 2011/0312390 | A1* | 12/2011 | Wang | H04M 3/02 455/567 |
| 2012/0185905 | A1* | 7/2012 | Kelley | H04N 9/75 725/109 |
| 2013/0177295 | A1* | 7/2013 | Cath | H04N 5/44543 386/241 |
| 2013/0222418 | A1* | 8/2013 | Campbell | G06F 3/14 345/629 |
| 2014/0210939 | A1* | 7/2014 | Mock | H04L 65/605 348/14.03 |
| 2014/0325396 | A1* | 10/2014 | Sterman | H04L 65/1069 715/756 |
| 2014/0351721 | A1* | 11/2014 | DeLuca | G06F 9/4443 715/760 |

OTHER PUBLICATIONS

Karmouch, Ahmed, Emery, James, "A Playback Schedule Model for Multimedia Documents," 1996 http://ieeexplore.ieee.org/stamp/stamp.jsp?arnumber=486704&tag=1.*
Wowza "Add Graphical Overlays to a Live Stream;" Nov. 8, 2011, https://www.wowza.com/docs/how-to-add-graphic-overlays-to-live-streams-with-wowza-transcoder.*
8×8, Inc. "Managing Bandwidth Usage on Polycom Video Endpoints;" Jul. 2011, http://sims.8x8.com/Documents/710588_5_Managing_Bandwidth_Usage_on_Polycom_Video_Endpoints_-VVX_and_HDX.pdf.*
"Communication Module;" Feb. 22, 1997, https://web.archive.org/web/19970222151648/http://www.worldtrans.org/TP/TP2/TP2B-16.HTML.*
French Search Report and Written Opinion dated May 13, 2014 for corresponding French Patent Application No. 1358179, filed Aug. 26, 2013.
English translation of the French Search Report and Written Opinion dated May 13, 2014 for corresponding French Patent Application No. 1358179, filed Aug. 26, 2013.

* cited by examiner

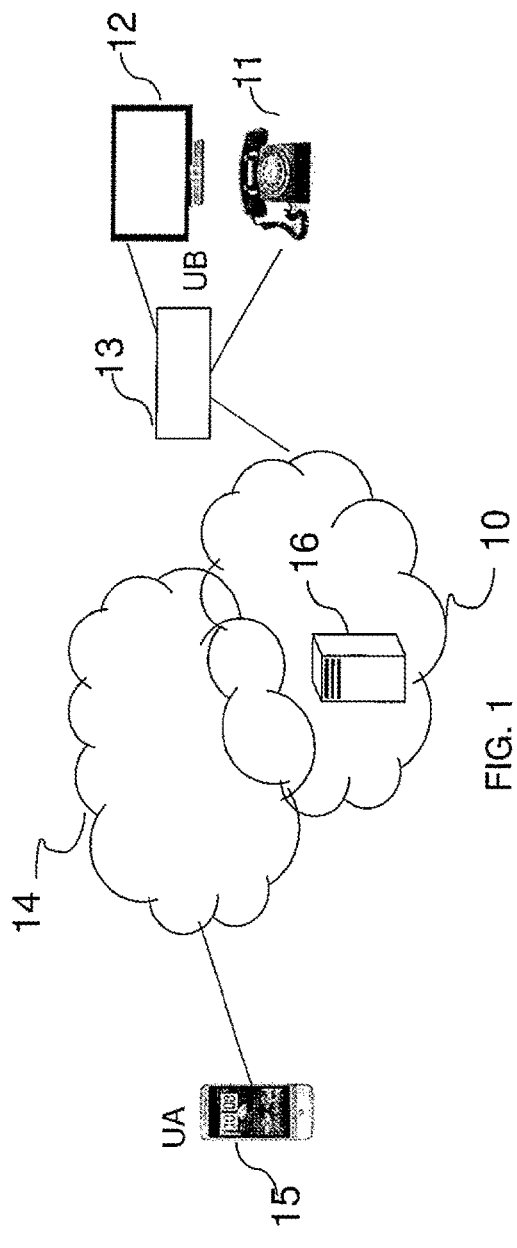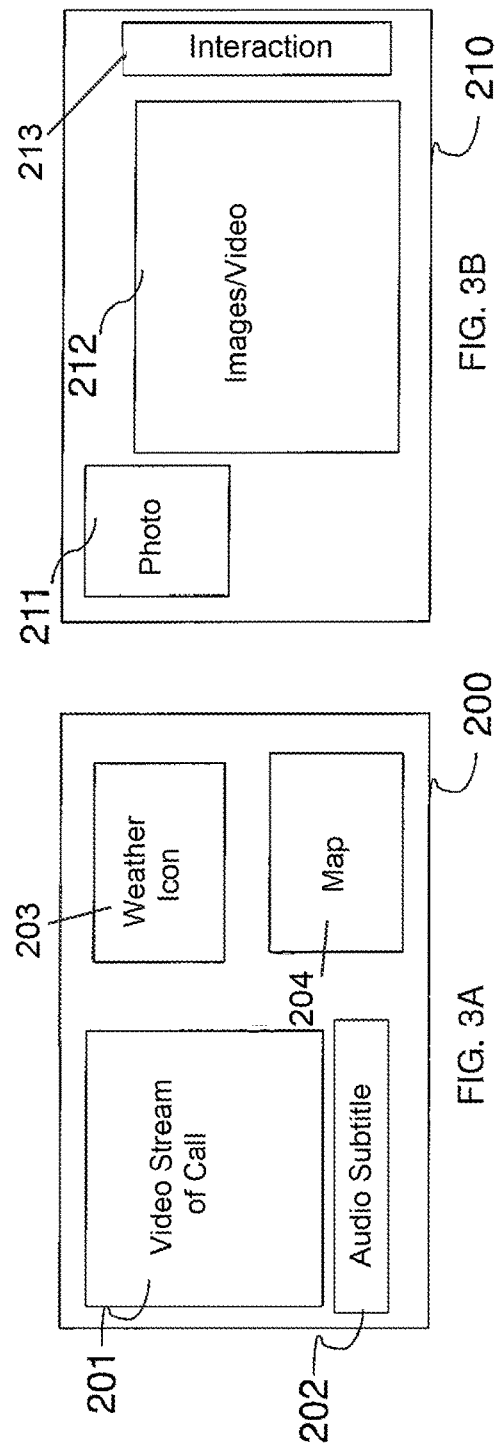

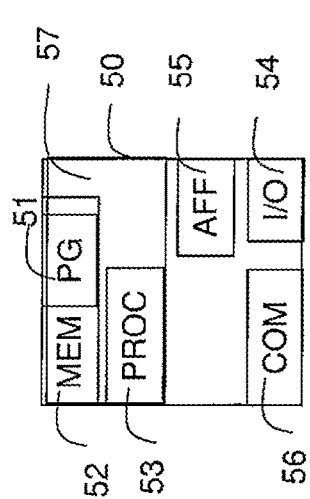
FIG. 5
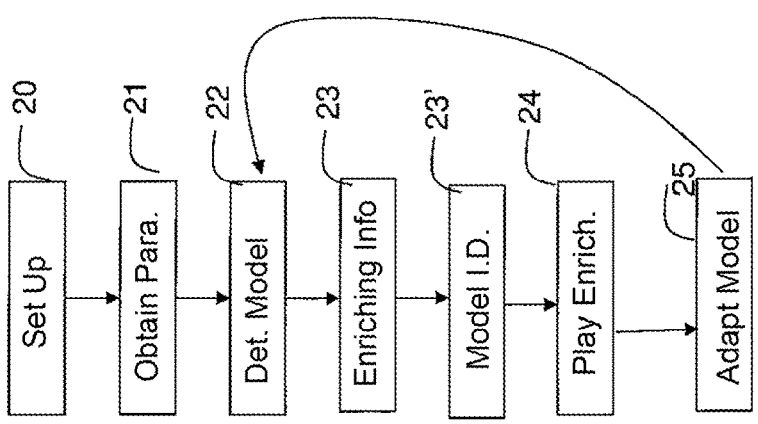
FIG. 2
FIG. 4

METHOD AND A DEVICE FOR ENRICHING A CALL

FIELD OF THE INVENTION

The invention lies in the field of telecommunications networks. It relates to a device and a method for enriching a call.

PRIOR ART

It is nowadays possible to set up calls between user terminals in various call modes, and in particular audio, video, text, white board, etc. . . . calls. With the proliferation of new communications protocols such as the rich communications services (RCS) protocol, for example, a user can share images, videos, multimedia contents with a third party during a telephone call or a video phone call.

Furthermore, it is nowadays possible to enrich a call by adding contents that are presented on the terminal of a user participating in the call. For example, Document US 2010/0159942 A1 describes a method enabling additional information to be displayed on the screen of a terminal of a first user in communication with a second user, which additional information may vary depending on the context of the call, e.g. the name and a photo of the second user, an indication of the location of the second user, information relating to said location such as the weather, or news information.

In order to set up enriched calls, a user may nowadays make use of terminals having characteristics that are very different, in particular in terms of display and data processing capacities.

For example, a user may use a terminal of the mobile type in order to set up a call with the user having a terminal of the softphone type, also referred to as a software telephone, that is installed on a personal computer or on a high definition (HD) television connected to the Internet protocol (IP) network.

Calls may also be set up on communications networks having different transmission capacities, which capacities may fluctuate to a greater or lesser extent in terms of bandwidth, thereby having an impact on the quality of a call.

As a result, the quality of an enriched call between two parties depends in particular on the capacities of the terminals and of the communications networks that are in use.

SUMMARY OF THE INVENTION

An exemplary embodiment of the invention provides a method of enriching a call set up between at least a transmitter terminal and a receiver terminal, the method comprising a step of the receiver terminal receiving at least one item of enriching information. The method of enriching a call further comprises:
- an obtaining step of obtaining at least one parameter relating to the call;
- a determining step acting as a function of the obtained parameter relating to the call to determine at least one playback model enabling said enriching information and a visual information of the call to be positioned on a display device associated with the receiver terminal; and
- a playback step of playing back said enriching information and the visual information of the call on the receiver terminal in application of the determined playback model.

The method of enriching a call thus makes it possible to take account of the parameters of the call in order to adapt the way the enriching information and a visual stream of the call are played back on a display device associated with the receiver terminal. By way of example, a visual stream of the call corresponds to the video stream of the call if it is a video phone call, or to an image of the user of the transmitter terminal, or merely to an icon or a message indicating that the current call is with so and so. Such a visual stream of the call then corresponds to a visual information of the call.

By way of example, the parameters relating to the call correspond to the transmission capacity of the communications network to which the receiver terminal is connected or to the transmission capacity of the communications network to which the transmitter terminal is connected, or to the display or processing capacity of the receiver terminal or of the transmitter terminal, or to the type and the quantity of enriching information received by the receiver terminal.

In an embodiment of the invention, a playback model corresponds to a way of displaying data received by the receiver terminal. A playback model comprises in particular parameters relating to the positioning of information for display on a display device associated with the receiver terminal. Thus, each item of information that is to be displayed is associated in the playback model with a spatial positioning parameter on a display interface. Each spatial parameter may also be associated with a type of information that is to be displayed (image, video, sound, text, etc. . . . ).

Displaying the enriching information and the visual stream of the call in application of the determined playback model makes it possible to offer video type rendering to the user of the receiver terminal. The enriching information and the visual stream of the call are positioned automatically on the user's screen in a manner that is optimized as a function of the display capacities of the receiver terminal, without any need for the user to intervene on the display.

The various implementation characteristics or features mentioned below may be added independently or in combination with one another to the steps of the above-defined call enrichment method.

In a particular implementation of the invention, when the visual information of the call is the video stream of the call and that the parameter relating to the call corresponds to the addition of an enriching video stream to the call, the determined playback model corresponds to a playback model allowing to playback the visual information of the call in the form of an image from the stream of the video stream of the call or in the form of an image of a user of the transmitter terminal. In this particular implementation of the invention, the enriching video stream added to the call is the enriching information received by the receiver terminal.

This particular implementation of the invention allows, when an enriching video stream is added to the call, to change the playback of the video stream of the call to a still image mode display.

This particular implementation of the invention allows optimizing the usage of the processing capacities of the receiver terminal, in particular when the processing capacities of the receiver terminal are limited. For example, the receiver terminal may not have enough resources to decode and to playback the video stream of the call and the added enriching video stream. In this particular implementation of the invention, the receiver terminal only plays back one video stream. The receiver terminal battery is optimized and the playback of the enriching video stream is more fluid than if two video streams were played back simultaneously by the receiver terminal. In this particular implementation of the invention, the user of the receiver terminal keeps a visual information of the call which is displayed in the form of an image. For example, the receiver terminal displays an image from the video stream of the call. Such an image may be updated regularly during the call from the received video stream of the call.

By way of another example, the receiver terminal displays an image of the user of the transmitter terminal, which is for example stored in a memory of the receiver terminal.

In a particular implementation of the invention, when the playback of the added enriching video stream finishes, the determining step of a playback model is iterated in order to determine a new playback model allowing to playback the visual information of the call in the form of a video stream.

This particular implementation of the invention allows to the receiver terminal to automatically change the display of the visual information of the call from an image mode to a video mode. The call in video mode can thus be resumed between the two users without the need of a manual intervention from one or the other of the users.

In a particular implementation of the invention, the determined playback model includes a time parameter associated with said enriching information.

In this particular implementation of the invention the enrichment information is also positioned in time during the call. The enrichment information is displayed from a time instant and for a display duration that are determined by the playback model. Thus, the playback model makes it possible during the call to refresh the enriching information that is displayed.

In a particular implementation of the invention, each item of enriching information that is played back in application of the determined playback model may vary independently of other items of enriching information being played back or to be played back. Each item of enriching information is associated with its own time parameters: instant of display, predetermined duration of display. The time parameters of an item of enriching information are also independent of the duration of the playback model. For example, for a playback model that is to last for a maximum of 14 seconds (s), this particular implementation enables the two most recently received short message service (SMS) messages exchanged between the transmitter terminal and the receiver terminal to be displayed in a first display zone as subtitles, each for a duration of 7 s, and enables three photos to be scrolled, each for a duration of 4 s (with a transition of 1 s between photos) in a second display zone.

In a particular implementation of the invention, the playback model is determined by a predetermined time interval or until the occurrence of a triggering event that triggers an iteration of the step of determining the playback model.

In this particular implementation of the invention, the method of enriching a call enables the playback model for the enriching information and for the visual stream of the call to be adapted automatically while the call is in progress. The method of enriching a call thus enables the enriching information and the visual stream of the call to be displayed dynamically.

In another example, the determined playback model is used for playing back enriching information for a predetermined duration. Once this duration has reached a predetermined value, the method changes the playback model. The display on the device associated with the receiver terminal is then modified, thus enabling the attention of the user of the receiver terminal to be captured for longer.

This particular implementation of the invention enables enriching information to be displayed dynamically.

In another particular implementation of the invention, the event triggering an iteration of the step of determining a playback model corresponds to detecting a modification to at least one parameter relating to the call.

In this particular implementation of the invention, the method adapts the playback of the enriching information of the call as a function of the context of the call. For example, if the call is set up over a network of varying bandwidth, the quantity and the quality of the enriching information and of the data streams of the call will vary. For example, in this particular implementation of the invention, if the quality of the video stream of a video phone call is insufficient because of a reduction in the bandwidth of the communications network to which the transmitter terminal is connected, then the display size of this stream is reduced, or else only a few images of the video are received and are displayed on the receiver terminal. In addition, if the bandwidth of the communications network to which the receiver terminal is connected makes this possible, additional enriching information is transmitted to the receiver terminal and displayed in application of the adapted playback model.

Obtaining enriching information thus makes it possible to optimize the use of the capacities of the receiver terminal in spite of bandwidth constraints (narrow bandwidth, quality of service not guaranteed, etc. . . . ) of the communications network to which the transmitter terminal is connected.

In another particular implementation of the invention, the event triggering an iteration of the step of determining a playback model corresponds to a user interaction performed on the receiver terminal.

In this particular implementation of the invention, the user of the receiver terminal can change the way in which the enriching information and the data streams of the call are played back to the user. For example, if the user finds that some of the enriching information available is not pertinent to the call or to the other party, the user may choose not to play it back.

In another example, the user may select to play back enriching information that was not initially made available to the user by the method, e.g. to add to the enriching information data that was exchanged during earlier calls, such as SMS, multimedia messaging service (MMS), or e-mail messages, etc. . . . . The method of enriching a call thus adapts the previously determined playback model as a function of user selection in order to play back the added enriching information.

In another particular implementation of the invention, the playback model is determined by selecting a playback model from a group of previously-determined playback models, said selection being performed as a function of the enriching information to be played back or as a function of the capacities of the receiver terminal.

In this particular implementation of the invention, the playback model is determined by selecting a previously stored playback model. Selecting an existing playback model makes it easy to obtain the parameters of the playback model that are to be applied to the data streams of the call and to the enriching information. Performing this particular implementation of the method is thus made simpler.

A previously stored playback model may be selected depending on the type of enriching information to be played back by the receiver terminal. For example, if the user of the transmitter terminal has selected a set of images to be displayed on the receiver terminal, the receiver terminal or the transmitter terminal selects a playback model that enables each selected image to be displayed for a predetermined duration.

In another particular implementation of the invention, the enriching information that is received is defined as a function of the determined playback model.

In this particular implementation of the invention, the enriching information is obtained by the receiver terminal as a function of the determined playback model.

For example, if the user of the transmitter terminal accepts to disclose location, a playback model suitable for displaying enriching information associated with the location of the transmitter terminal is determined.

This particular implementation of the invention makes it possible, when a playback model is determined on the basis of a parameter of the call, to receive enriching information associated with the playback model. For example, the determined playback model specifies a category of enriching information that is to be played back (location, weather, news, personal data, etc. . . . ), or the determined playback model indicates the type of information to be played back (images, video, text, audio, etc. . . . ).

In another particular implementation of the invention, the playback model is determined by the transmitter terminal.

In this particular implementation of the invention, the playback model is determined for example as a function of the type of enriching information that the user of the transmitter terminal desires the receiver terminal to play back. By way of example, if the user of the transmitter terminal selects a set of images for transmitting to the receiver terminal in the form of a slide show, then the transmitter terminal determines a playback model that includes display parameters for displaying single images from a set of images at regular intervals and for a predetermined duration.

In a particular implementation of the invention, the method of enriching a call includes a step of sending data representative of the determined playback model to the receiver terminal.

The data representing the playback model sent to the receiver terminal may correspond, for example, to the parameters of the playback model that are to be applied to the enriching information received by the receiver terminal and to the visual stream of the call.

In a variant, the data representing the playback model enables the receiver terminal to obtain the parameters of the playback model, e.g. when the playback model is a model that has already been predefined. Said parameters are then stored in a memory to which the receiver terminal has access.

An embodiment of the invention also provides a device for enriching a call that is set up between at least a transmitter terminal and a receiver terminal, the device comprising means for receiving at least one item of enriching information. The device further comprises:
 means for obtaining a parameter relating to the call;
 means for acting as a function of the parameter relating to the call to determine a playback model enabling said enriching information and a visual information of the call to be positioned on a display device associated with the receiver terminal; and
 means for playing back said enriching information and the visual information of the call in application of the determined playback model.

An embodiment of the invention also relates to a terminal including a device for enriching a call as described above.

An embodiment of the invention also provides a server including a device for enriching a call as described above.

An embodiment of the invention also provides a message for a receiver terminal, the message being transmitted during a call that is set up between the receiver terminal and at least one transmitter terminal, the receiver terminal receiving at least one item of enriching information for the call. The message comprises at least data representative of a playback model determined as a function of a parameter relating to the call and enabling said enriching information and a visual information of the call to be positioned, said enriching information and the visual information of the call being played back in application of the determined playback model on the display device associated with the receiver terminal.

In a particular implementation, the steps of the method of enriching a call are performed by computer program instructions.

Consequently, an embodiment of the invention also provides computer programs on a data medium, which programs are suitable for being performed respectively in a terminal or more generally in a computer, these programs respectively including instructions adapted to performing the various steps of the above-described method of enriching a call.

These programs may use any programming language, and be in the form of source code, object code, or of code intermediate between source code and object code, such as in a partially compiled form, or in any other desirable form.

An embodiment of the invention also provides a computer readable data medium including instructions of a computer program as specified above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means such as a hard disk, or a universal serial bus (USB) key, for example.

The data medium may also be a transmissible medium such as an electrical or optical signal suitable for being conveyed via an electrical or optical cable, by radio, or by other means. The program of an embodiment of the invention may in particular be downloaded from an Internet type network.

Alternatively, the data medium may be an integrated circuit in which the program is incorporated, the circuit being adapted to execute or to be used in the execution of the method in question of enriching a call.

LIST OF FIGURES

Other advantages and characteristics appear more clearly on reading the following description of a particular implementation of the invention given merely by way of illustrative and non-limiting example, and with reference to the accompanying drawings, in which:

FIG. 1 shows an environment for performing an embodiment of the invention in a particular implementation;

FIG. 2 shows steps of the method of enriching a call in a particular implementation of the invention;

FIGS. 3A and 3B are diagrams showing playback model interface examples in a particular implementation of the invention;

FIG. 4 shows a message including data representative of a playback model received by a terminal in a particular implementation of the invention; and FIG. 5 shows a device enabling the method of enriching a call to be performed in a particular implementation of the invention.

DESCRIPTION OF A PARTICULAR IMPLEMENTATION OF THE INVENTION

FIG. 1 shows an environment for performing the invention in a particular implementation. The environment comprises a group of communications networks 10 and 14 having connected thereto: terminals 11, 12, and 15; a home gateway 13; and an enriching information server 16.

The terminals 11, 12, and 15 may be of any type of terminal suitable for setting up a telephone or video phone call, such as a portable telephone, a smart phone, a tablet, a television connected to a telecommunications network, or a personal computer having a telephone application installed thereon, also known as a softphone.

In the presently-described example, the terminal 15 is a terminal of the smart phone type associated with a user UA. The terminal 15 is connected to the communications network 14 and can transmit and receive any type of call via the communications network 14. For example, the communications network 14 may be a mobile communications network of the GSM, EDGE, 3G, 3G+, 4G, . . . type. It may be implemented using an architecture of the RCS type.

In the environment described with reference to FIG. 1, a user UB may for example have a fixed terminal 11 of the digital enhanced cordless telephone (DECT) type and a terminal 12 of the connected television type. The terminals 11 and 12 are connected to a home gateway 13 enabling the terminals to access the communications network 10. The communications network 10 may correspond to an Internet protocol (IP) network. By way of example, the communications network 10 may be implemented using an IP multimedia subsystem (IMS) type architecture.

The communications network 10 and the communications network 14 are interconnected via interconnection servers (not shown). The communications network 10 and the communications network 14 serve to exchange data and to establish calls between terminals connected to the communications network 10 or to the communications network 14.

The user UB can send and receive conventional telephone calls (of the public switched telephone network (PSTN) type using the terminal 11. The user UB can also use the terminal 12 to send and receive calls of the voice over IP (VoIP) type in voice mode or in videophone mode.

By way of example, the enriching information server 16 is connected to the communications network 10, however it could equally well be connected to the communications network 14. On request, the enriching information server 16 serves to provide enriching information of image, video, text, or sound type that can be played back on a terminal during a call.

By way of example, the server 16 supplies information relating to the location of a terminal specified in an enriching information request sent to the server 16. Such information may be a geographical map showing the location of the terminal, information about the weather at that location, news data relating to the location, images, or videos relating to the location. In a variant, the server 16 provides enriching information relating to the day, to the season, or to the time at which the request is received. For example, if the enriching information request is sent in winter, the photos provided by the server 16 show the location in winter. If the request is sent at night, the photos provided by the server 16 show the location photographed at night, etc.

In another example, the server 16 provides information about an ongoing call, e.g. between the terminal 12 and the terminal 15, such as a transcript in text of an audio call between the two terminals, or a translation in text or in audio mode in a language other than the language of the audio call.

By way of example, the terminals 12 and 15 may communicate with the server 16 via requests and responses sent using the hypertext transfer protocol (HTTP).

FIG. 2 shows the steps of the method of enriching a call in a particular implementation of the invention. In the presently-described implementation, the invention is performed by the terminal 12 in FIG. 1.

During a step 20, a call, e.g. a video phone call, is set up in conventional manner between the terminal 12 and the terminal 15, e.g. using the session initiation protocol (SIP).

During a step 21, the terminal 12, considered by way of example as the terminal receiving the call, obtains a parameter relating to the call and representative of the capacity of the transmitter terminal 15 or of the receiver terminal 12 or of the communications network to which the transmitter terminal or the receiver terminal is connected. The "capacity" of a terminal is used to mean for example the display capacity of the terminal, the capacity of the terminal to pick up a video stream, the portrait or landscape camera mode of the terminal, the transport protocols and the codecs supported by the terminal, the functions or applications installed on the terminal, the communications modes supported by the terminal (audio, video, shared drawing, instant messaging, etc. . . . ).

The "capacity" of a communications network is used to mean in particular the bandwidth of the communications network, the quality of service of the communications network, the protocols it supports, etc. . . . .

In a particular implementation of the invention, during the step 21, the terminal 12 determines that the display capacity of its screen is greater than the capacity needed to provide a high quality display of the video stream of the call as transmitted by the terminal 15.

During a step 22, the terminal 12 then determines a playback model for displaying the enriching information in addition to the video stream of the call.

For example, the terminal 12 may determine a playback model of the kind shown in FIG. 3A.

The playback model 200 shown in FIG. 3A corresponds to a display presenting the video stream 201 of the call sent by the terminal 15 in the upper left corner of the screen of the terminal 12, a display of information relating to the location of the terminal 15 on the right, e.g. a geographical map 204 at the bottom with an icon 203 representing the weather at the top, and a display 202 subtitling the audio call in the bottom left corner.

In a particular implementation of the invention, the receiver terminal 12 determines the playback model on the basis of a previously established group of playback models. The parameters of these predetermined playback models may for example be stored in a memory associated with the receiver terminal or on the enriching information server 16. In this particular implementation of the invention, a particular playback model from among the group previously calculated playback models is selected on the basis of the capacities of the receiver terminal.

The playback model that is determined comprises spatial positioning parameters enabling the enriching information and the video data stream of the call to be positioned on the screen of the terminal 12 in application of the playback model shown in FIG. 3A. The playback model also includes a time positioning parameter associated with each item of enriching information indicating the instant relating to the beginning of the current call at which the enriching information is to be displayed and the length of time during which the enriching information is to be displayed. For example, the enriching information concerning the location of the transmitting terminal 15 may be displayed from the beginning of the call for a duration of 5 minutes, whereas the subtitling of the call is displayed from the beginning to the end of the call.

During a step 23, the terminal 12 receives at least one item of enriching information for the call.

In a particular implementation of the invention, the enriching information is sent by the enriching information server 16 following a request transmitted by the terminal 12 or by the terminal 15. For example, the enriching information request sent to the server 16 may contain an indication of the location of the terminal 15. On receiving this request, the server 16 collects enriching information associated with that location and transmits it to the terminal 12 which receives the information in a step 23.

If the terminal 15 is moving, a request is transmitted regularly to the server 16 by the terminal 15 providing its own location data in the request so as to enable the server 16 to supply the terminal 12 regularly with enriching information about the new location of the terminal 15.

In a variant, the server 16 may be associated with a database storing data about the paths followed by the terminal 15. Depending on the time of the request sent by the terminal 15, on the location of the terminal 15, and on stored path data, the server 16 identifies a path being followed by the terminal 15 during the call with the terminal 12. In this variant, the server 16 then sends enriching information to the terminal 12 about the path or about future locations of the terminal 15.

In another example, the enriching information request sent to the server 16 contains the audio stream of the call. By way of example, the server 16 then sends as enriching information text that constitutes a transcript of the audio stream or that relates to its translation into another language.

Reception of the enriching information may be renewed during the call, e.g. as a result of the user UA interacting with the terminal 15, or as the result of the terminal 15 or the terminal 12 sending a request to the server 16, or as a result of a change in the parameters of the call.

During a step 24, the terminal 12 plays back the enriching information received during the step 23, and where appropriate the video stream of the call, depending on the playback model determined in step 22.

By way of example, the enriching information is played back by the terminal 12 by means of an application displaying an interface that incorporates the enriching information and the video stream of the call at the positions specified by the playback model. The enriching information and the video stream of the call as displayed on the interface in compliance with the playback model provides the user of the terminal 12 with visual rendering similar to the visual rendering of an interface displaying a video on the screen of the terminal 12. The user of the terminal 12 thus has the impression of watching a video that includes enriching information and the video stream of the call. The interface may be displayed over the entire screen of the terminal 12 in order to optimize use of the display capacities of the terminal.

In another particular implementation of the invention, the enriching information is determined as a function of the playback model determined during step 22.

In a first example, the terminal 12 sends an enriching information request containing the location data of the terminal 15 and an indication of the display capacity of the terminal 12. In this example, the playback model is determined in step 22 by the enriching information server 16. The enriching information server 16 determines a playback model that enables the location information to be displayed and that is adapted to the display capacities of the terminal 12. The enriching information server 16 then collects enriching information associated with the location of the terminal 15.

During the step 23, the enriching information server 16 transmits the collected enriching information to the terminal 12 together with the parameters of the determined playback model. The parameters of the playback model may be sent to the terminal 12 in a message including data representing the playback model and enabling the terminal 12 to apply the playback model as determined by the enriching information server 16.

In a variant, the playback model is determined beforehand by the terminal 12 and is transmitted to the enriching information server 16.

In another particular implementation of the invention, the terminal 12 is a terminal having restricted display capacity, e.g. the terminal 12 is a mobile terminal. The call between the terminal 12 and the terminal 15 as set up during step 20 may for example be a video phone call over a network that does not have guaranteed quality of service. In this particular implementation of the invention, during the step 21, the terminal 12 determines that its display capacity does not enable it to play back to the user of the terminal 12 both the video stream of the call and call enriching information.

During the step 22, the terminal 12 then determines a playback model enabling images of the video stream of the call coming from the transmitting terminal to be displayed on the screen of the sending terminal in alternation with images relating to enriching information of the call.

In this particular implementation of the invention, during step 23, image type enriching information is obtained by the terminal 12, e.g. by consulting a memory space of the terminal 12 containing in particular photos showing the user of the terminal 15. The terminal 12 obtains the photos showing the user of the terminal 15, e.g. from metadata saved in association with the stored photos. The terminal 12 identifies the enriching information, e.g. by matching the metadata associated with the stored photos with the identity of the user of the terminal 15 with which a call is in progress.

During the step 24, the photos obtained are played back by the terminal 12 to the user using the playback model as determined in step 22.

In another particular implementation of the invention, the call between the terminal 12 and the terminal 15 as set up during step 20 may for example be a video phone call. The video stream of the call is then the visual information of the call.

During the video phone call, the user of the terminal 15 activates a content sharing function or a file transfer function in order to share or transfer a video stream with the user of the terminal 12 during the video phone call. For example, the terminal 15 uses the «Sharing» function or «Transfer» function of the RCS standard.

During the step 21, the terminal 12 obtains a parameter relating to the call. The obtaining of such a parameter is made by the detection by the terminal 12 of the activation of the content sharing function or of the file transfer function by the user of the terminal 15. Such a detection is for example made by the reception of a message according to the RCS standard informing the terminal 12 of the activation of the content sharing function or of the file transfer function.

The enriching video stream added by the terminal 15 to the call is an enriching information of the call. Such a video stream may be a video stream stored on the terminal 15 or on the enriching server 16 or a video stream captured in real time by for example a second camera of terminal 15 or by an acquisition device associated to terminal 15, such as a webcam.

During the step 22, the terminal 12 determines a playback model to change the playback of the video stream of the call in a display in an image mode and to simultaneously playback the enriching video stream added to the call by terminal 15.

The playback of the video stream of the call in an image mode may be made by a stop on image from the video stream of the call. Only one image from the video stream of the call is decoded and displayed by terminal 12.

In a variant, such an image may be regularly updated, for example each 5 or 10 seconds.

In a variant, the change of the playback of the video stream of the call to an image mode may be made by the display of an image of the user of terminal 15, for example an image stored on terminal 12. In this variant, the call between terminal 12 and terminal 15 may be change to an audio mode only in order to limit the usage of the resources of the network used for the transmission of the video data of the call and to optimize the usage of the resources of terminals 12 and 15.

The added enriching video stream is received by the terminal 12 during the step 23. During the step 24, the terminal 12 plays back the added enriching video stream and the visual information of the call. The visual information of the call is played back in the form of an image.

In a particular implementation of the invention, when the playback of the added enriching video stream finishes, terminal 12 operates a new determining step to determine a playback model allowing to change the playback of the visual information from an image mode to a video stream mode.

In another particular implementation of the invention, during step 22, the playback model is determined by the terminal 15.

The enriching information may be sent by the terminal 15 at the initiative of the user UA. For example, the user UA may select to enrich the call by sending to the user UB of the terminal 12 a document for comment during the call. For example, the user UA may send photos, videos, text files, or images, using the RCS protocol.

In this particular implementation of the invention, and by way of example, the user of the terminal 15 selects a set of images for transmitting to the terminal 12. The images for transmitting to the terminal 12 may be stored in the terminal 15 and transmitted to the terminal 12. In a variant, the images for transmitting to the terminal 12 are stored in an on-line server of the communications network 10, e.g. the enriching information server 16, and the terminal 15 accesses them via an electronic address of the uniform resource locator (URL) type.

During the step 21, the terminal 15 determines that the enriching information of the call is to be transmitted to the terminal 12, e.g. by detecting activation of the document-sharing function of the telephony application of the terminal 15. In this particular implementation of the invention, at least one item of enriching information for transmission corresponds to a parameter relating to the call.

During the step 22, the terminal 15 then determines a playback model suitable for displaying at least the enriching information selected by the user of the terminal 15. For example, the determined playback model comprises parameters enabling successive images of the set of images to be displayed one-by-one at regular intervals and for predetermined durations.

By way of example, the playback model determined during the steps 22 previously described corresponds to the playback model 210 shown in FIG. 3B. In its central portion, the playback model 210 has a presentation zone 212 in which the playback interface displays the images or the videos transmitted by the terminal 15 or selected by the terminal 15 on the server 16 and transmitted by the server 16. On the left, the playback model has a presentation zone 211 in which the playback interface displays a photo showing the user of the terminal 15. The photo showing the user of the terminal 15 may be a photo sent by the terminal 15 when setting up the call during step 20, or a photo stored in an address book of the terminal 12 in association with the details of the user of the terminal 15. The presentation zone 211 may also be used to display the video stream of the call if it is a video phone call.

On the right, the playback model 210 has an interaction zone 213 in which the playback interface displays interactive menus enabling the user of the terminal 12 to interact with the interface.

During the step 23, the terminal 12 receives the enriching information, in this example the images selected by the user of the terminal 15, and coming either from the terminal 15 or from the server 16.

In this particular implementation of the invention, during a step 23' shown in FIG. 2, the terminal 12 receives data representative of the playback model determined in step 22. The data representative of the playback model enables the terminal 12 to obtain the determined playback model. For example, the representative data corresponds to an identifier of a playback model enabling the playback model determined by the terminal 15 to be identified from among a group of playback models stored on the terminal 12.

In a variant, the data representative of the playback model includes the parameters of the playback model that the playback interface of the terminal 12 is to apply in order to play back the enriching information and the visual data of the call.

By way of example, the data representative of the playback model is sent in a field of message of the call between the terminal 15 and the terminal 12. The portion relating to the playback model in such a message may be as shown in FIG. 4, by way of example.

The message shown in FIG. 4 comprises a first field NB specifying the number of zones that the playback interface is to display on the screen of the terminal 12. In the particular implementation of the invention, this field has the value 3. Thereafter the message has spatial positioning parameters (X1, Y1, X2, Y2, and X3, Y3) for each of the zones to be displayed, together with the horizontal and vertical sizes of each of the zones (DX1, DY1, DX2, DY2, DX3, DY3). The message also has the type of data (DAT1, DAT2, DAT3) to be displayed in each of the zones. By way of example, the type of data may correspond to an image, a video, a text, an audio file, or an interaction zone. A data type field of the message may also correspond to a plurality of data types. For example, in the presently-described particular implementation, the field DAT2 has a value specifying a zone for displaying a set of images. Depending on the type of data to be displayed, the data type field may be followed by one or more parameters. In this particular implementation, the field DAT2 is followed by a parameter T indicating a duration during which each image in the set is to remain on display before the next image of the set is presented on the screen. Still in this particular implementation, the field DAT3 is followed by a group of parameters DD4 specifying the menus to be displayed in the interaction zone 213 shown in FIG. 3B and the actions associated with each menu. For example, the parameter group DD4 may specify that the interaction zone 213 has an "open" menu that enables the user of the terminal 12 to search the terminal for a file stored in the memory of the terminal and display it in the central zone 212.

In the presently-described particular implementation of the invention, during the step 24 of FIG. 2, the terminal 12 plays back the enriching information in application of the playback model obtained during the step 23'.

In a particular implementation of the invention, the interface for playing back the enriching information and the video stream of the call in application of a playback model is an interactive interface with which the user of the terminal 12 can interact.

The interface may have an interaction zone in which the user can select menus associated with actions, e.g. the interaction zone 213 described with reference to FIG. 3B.

In a variant, each playback zone may be interactive. For example, with reference to FIG. 3B, when the user of the terminal 12 interacts with the zone 211, a menu proposing possible actions for this zone is displayed. The user can select enriching information for display associated with the other party, such as a different photo or displaying the video stream of the call.

In another example, when the user of the terminal 12 interacts with the zone 212, a menu is displayed enabling the user to display another document. The user can then search the memory of the terminal 12 for a document to display in the zone 212. The user can also input a URL in the address field of the menu, thereby enabling a web page to be displayed that corresponds to the URL that has been input.

The interaction zone 213 may also include a menu enabling the user of the terminal 12 to modify the playback model used by the interface of the terminal 12.

For example, if the playback model involves playing back the video stream of the call in the central portion 212 of the interface, but the user of the terminal 12 does not wish the video of the other party to be displayed over a large portion of the screen, the user of the terminal 12 selects a new playback model. For example, the user selects a playback model displaying location information using the model shown in FIG. 3A.

In this particular implementation of the invention, after the user has interacted with the playback interface during a step 25 shown in FIG. 2, the terminal 12 adapts the playback model as a function of the user interaction. The adaptation to the playback model corresponds to determining a new playback model. The new playback model is determined in the same manner as in step 23 for determining the initial playback model while taking account of the user interaction as a parameter relating to the call.

In another particular implementation of the invention, the step 25 corresponds specifically to an event triggering an iteration of the step 23. The triggering event may correspond for example to detecting a modification to a parameter relating to the call.

For example, if the initially determined playback model comprises playing back the video stream of the call on a large portion of the screen of the terminal 12, and if the bandwidth available in the communications network to which the terminal 15 is connected drops, then the terminal 12 detects a change to a parameter relating to the ongoing call, here a reduction in its bandwidth. The terminal 12 then acts during the step 23 to determine a new playback model in compliance with the modified call parameter.

By way of example, the terminal 12 determines a playback model enabling enriching information provided by the enriching server 16 to be displayed in alternation with images taken from the video stream of the call.

In another example, the parameter relating to the call corresponds to the terminal 12 receiving enriching information transmitted by the terminal 15 or by the enriching server 16. For example, if the user of the terminal 15 activates transmission of its location during the call, then the location of the terminal 15 is transmitted to the terminal 12 in a message of the call. During a new step 23, the terminal 12 then determines a new playback model enabling the information relating to the location of the terminal 15 to be displayed.

FIG. 5 shows a device enabling the method of enriching a call to be performed in a particular implementation of the invention.

The device 50 comprises a data processor module 57 having storage space 52, e.g. a memory (MEM), a processor unit 53, e.g. having a microprocessor (PROC), and controlled by the computer program (PG) 51 for performing a particular embodiment the method of the invention of enriching a call as described with reference to FIG. 2.

On initialization, the code instructions of the computer program 51 are, for example, loaded into memory prior to being executed by the processor of the processor unit 53. The microprocessor of the processor unit 53 then executes the instructions of the computer program 51 to perform the steps of the method of enriching a call as set up between at least one transmitter terminal and one receiver terminal, and in particular:

the step of the receiver terminal receiving at least one item of enriching information;

the step of obtaining a parameter relating to the call;

the step of determining a playback model enabling said enriching information and the visual information of the call to be positioned on a display device associated with the receiver terminal, such determining step taking the parameter relating to the call into consideration in order to determine the playback model, said determined playback model including at least a spatial positioning parameter associated with said enriching information; and the step of playing back said enriching information and the visual information of the call on the display device associated with the receiver terminal, in application of the determined playback model.

In a particular embodiment, such a determined playback model includes a time parameter associated with said enriching information.

In a particular implementation of the invention, the device 50 also has user interaction means 54 (I/O) enabling the user to interact with the device 50, e.g. in order to modify the playback model or to select information that is to be played back in a playback model. By way of example, the user interaction means 54 may be performed by user interface means. The user interface may correspond to a keyboard, a mouse, or a touch screen.

The device 50 has playback means 55 for playing back enriching information and call data. By way of example, the playback means are constituted by a display module (AFF), which corresponds to the display device associated with the receiver terminal.

By way of example, the display module may correspond to a screen incorporated in the receiver terminal. The display module may also correspond to an interface communicating with a remote display device. For example, the receiver terminal may use a remote screen for displaying enriching information and the visual information of the call in order to benefit from display capacities that are greater than the display capacities of the terminal itself.

The device also has communications means 56. These communications means are constituted by a communications module (COM), for example. The communications module serves in particular to enable the device 50 to set up calls via a communications network 10 or 14 of FIG. 1, and to receive enriching information coming from a terminal 15 or from an enriching server 16.

The device 50 is included in a terminal, such as the terminal 12 of FIG. 1, for example. More generally, the device 50 is included in a terminal such as, for example, a personal computer, which may be a desk top or a laptop computer, a mobile telephone, a tablet, a connected television, a smart phone, etc. . . . .

In a particular implementation of the invention, the device 50 is included in a server.

Although the present disclosure has been described with reference to one or more examples, workers skilled in the art will recognize that changes may be made in form and detail without departing from the scope of the disclosure and/or the appended claims.

What is claimed is:

1. A method of enriching a call set up between at least a transmitter terminal and a receiver terminal, the method comprising:
    the receiver terminal receiving a first item of visual information of the call from the transmitter terminal and at least one second item of visual enriching information from a server distinct from the transmitter terminal, the at least one second item of visual enriching information comprising at least one of image, video, text or sound information and being received in response to a request sent to the server by either the transmitter terminal or the receiver terminal;
    the receiver terminal obtaining at least one parameter relating to at least a network bandwidth and a capacity of the receiver terminal;
    the received terminal determining as a function of the obtained parameter, at least one playback model selected from a group of previously-determined playback models comprising spatial positioning parameters enabling the at least one second item of visual enriching information and the first item of visual information of the call to be positioned on a display device associated with the receiver terminal; and
    playing back said at least one second item of visual enriching information and the first item of visual information of the call on the display device associated with the receiver terminal in application of the determined playback model, the second item of visual enriching information received from the server enriching the first item of visual information of the call received from the transmitter terminal.

2. The method of enriching a call according to claim 1 wherein, when the first item of visual information of the call is a video stream of the call and when the parameter relating to the call corresponds to an addition of an enriching video stream to the call, the determined playback model corresponds to a playback model enabling to playback the first item of visual information of the call in the form of an image from the stream of the video stream of the call or in the form of an image of a user of the transmitter terminal.

3. The method of enriching a call according to claim 2 wherein, when the playback of the added enriching video stream finishes, the determining of a playback model is iterated in order to determine a new playback model enabling to playback the first item of visual information of the call in the form of a video stream.

4. The method of enriching a call according to claim 1, wherein the determined playback model includes a time parameter associated with said at least one second item of visual enriching information.

5. The method of enriching a call according to claim 1, wherein that the playback model is determined by a predetermined time interval or until occurrence of a triggering event that triggers an iteration of the step of determining the playback model.

6. The method of enriching a call according to claim 5, wherein the event triggering an iteration of determining a playback model corresponds to detecting a modification to at least one parameter relating to the call.

7. The method of enriching a call according to claim 5, wherein the event triggering an iteration of determining a playback model corresponds to a user interaction performed on the receiver terminal.

8. The method of enriching a call according to claim 1, wherein the playback model is determined by selecting a playback model from a group of previously-determined playback models, said selection being performed as a function of the at least one second item of visual enriching information.

9. The method of enriching a call according to claim 1, wherein the at least one second item of visual enriching information that is received is defined as a function of the determined playback model.

10. A receiver terminal including a device for enriching a call that is set up between at least a transmitter terminal and the receiver terminal, the device comprising:
    communication circuitry configured to receive a first item of visual information of the call from the transmitter terminal and at least one second item of visual enriching information from a server distinct from the transmitter terminal, which comprises at least one of image, video, text or sound information;
    a non-transitory computer-readable medium comprising instructions stored thereon;
    a data processor configured by the instructions to:
        obtain a parameter relating at least to a network bandwidth and a capacity of the receiver terminal;
        act as a function of the parameter relating to the call to determine a playback model selected from a group of previously-determined playback models comprising spatial positioning parameters enabling the at least one second item of visual enriching information and the first item of visual information of the call to be positioned on a display device associated with the receiver terminal; and
        play back said first item of visual information of the call and the at least one second item of visual enriching information in application of the determined playback model, the at least one second item of visual enriching information comprising at least one of image, video, text or sound information and being received in response to a request sent to the server by either the transmitter terminal or the receiver terminal.

\* \* \* \* \*